(12) United States Patent
Linnartz

(10) Patent No.: US 6,209,092 B1
(45) Date of Patent: Mar. 27, 2001

(54) METHOD AND SYSTEM FOR TRANSFERRING CONTENT INFORMATION AND SUPPLEMENTAL INFORMATION RELATING THERETO

(75) Inventor: Johan P. M. G. Linnartz, Eindhoven (NL)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/014,170

(22) Filed: Jan. 27, 1998

(30) Foreign Application Priority Data

Jan. 27, 1997 (EP) .................................................. 97200165
Apr. 25, 1997 (EP) .................................................. 97201237
May 15, 1997 (EP) .................................................. 97201470

(51) Int. Cl.[7] ...................................................... H04N 7/16

(52) U.S. Cl. ............................................................ 713/176

(58) Field of Search .................................... 380/201, 202, 380/203; 705/57; 71/176

(56) References Cited

U.S. PATENT DOCUMENTS

| | | | |
|---|---|---|---|
| 5,689,559 | * 11/1997 | Park ...................................... | 380/203 |
| 5,719,937 | * 2/1998 | Warren et al. ......................... | 380/203 |
| 5,719,943 | * 2/1998 | Amada et al. ......................... | 380/202 |
| 5,724,327 | 3/1998 | Timmermans et al. ................. | 369/48 |
| 5,896,454 | * 4/1999 | Cookson et al. ....................... | 360/60 |

FOREIGN PATENT DOCUMENTS

WO9713248   4/1997 (WO) .

OTHER PUBLICATIONS

Bruce Schneier, "Applied Cryptography", 1996, pp. 30–31 and pp. 429–434.*
"New Directions in Cryptography", Whitfield Diffie and Martin E. Hellman, IEEE Transactions on Information Theory, vol. IT–22, No.6, Nov. 1976, pp. 644–654.

* cited by examiner

Primary Examiner—Tod R. Swann
Assistant Examiner—Matthew Smithers
(74) Attorney, Agent, or Firm—Michael E. Belk

(57) ABSTRACT

A method and system for recording and reproducing, such as on a record carrier, content information and supplemental information relating thereto. The content information may be audio and/or video, and the supplemental information may provide author identification and/or copy control status. An encoded signal is generated representing the content information and which includes a watermark pattern representing the supplemental information. The watermark pattern cannot be changed without impairing the quality of the content information during reproduction. The supplemental information also includes a control pattern, the watermark being generated by applying a one-way function to such control pattern. This has the advantage that any alteration of the watermark or the control pattern can be detected easily, because it is not computationally feasible to calculate a new control pattern for an altered watermark. Therefore, the supplemental information is well protected against unauthorized manipulation. An attempt to fully replace the watermark pattern will affect the quality of reproduction of the content information. In a copy control method allowing a first generation copy ("copy-once"), the original control pattern is processed several times by the one-way function for generating the watermark. Each player or recorder processes the control pattern once before outputting/recording it, thus forming a cryptographically protected down-counter.

26 Claims, 3 Drawing Sheets

METHOD AND SYSTEM FOR TRANSFERRING CONTENT INFORMATION AND SUPPLEMENTAL INFORMATION RELATING THERETO

BACKGROUND OF THE INVENTION

1. Field of the Invention

The invention relates to a method of recording and reproducing content information and supplemental information relating thereto, in which method an encoded signal representing the content information and a watermark pattern representing the supplemental information are recorded.

The invention further relates to a method of encoding content information and supplemental information relating thereto, in which an encoded signal is generated by encoding the content information in accordance with a watermark pattern representing the supplemental information.

The invention further relates to a method of retrieving supplemental information related to content information, in which a watermark pattern representing the supplemental information is retrieved from an encoded signal representing the content information and the watermark pattern.

The invention further relates to a system for recording and reproducing content information and related supplemental information, an arrangement for generating an encoded signal, an arrangement for processing an encoded signal, an encoded signal, a control signal and a record carrier.

2. Description of the Related Art

Such methods and such a system are described in patent application WO 97/13248 (PHN 15391), document D1 in the list of related documents. The document notes, that video and audio content information is increasingly being recorded in a digitally encoded form, for example, an MPEG bitstream. There is a growing need to transfer supplemental information logically related to the content information, which supplemental information is intended for controlling the processing of the content information. The supplemental information should be protected against manipulation in order to remain in command of the controlling function. Supplemental information is particularly useful in copy protection applications.

Copy protection has a long history in audio publishing. The presently installed base of equipment, including PC's with audio cards, provide little protection against unauthorized copying. In any copy-protection scheme, the most difficult issue is that a pirate can always attempt upon playback of an original disc, to treat the content as if it were an analog home recording and record it. It is desirable that consumer recorders be able to copy recordings of the consumer's own creative productions without any limitation, but prohibit the recording of copy-right material. Thus, the copy protection mechanism must be able to distinguish between consumers' own creations and content that originates from professional music publishers. The equipment must make this distinction based on the audio or video signal only, as any reference to the physical source of content (e.g. disc or microphone) is unreliable. For digital storage media such as DCC, "copy bits" have been defined, which bits indicate a copyright status, e.g. "no copy allowed", "free copy" or "one generation of copy allowed". Other copy bits may indicate that the medium containing the information is a "professional" medium manufactured by pressing and is not a "recordable" disc.

Marking the digital content signal, for example by a marker accommodated in such an encoded signal so as to classify the encoded signal as authentic programme material, is referred to as watermarking. In our system the watermark takes the form of a multi-bit pattern representing some supplemental information, e.g. indicating that the encoded signal constitutes copy protected content and/or indicate the origin of the content. A watermark usually has a fixed part to identify the bit pattern as a valid watermark and/or synchronising the retrieval process, and may comprise a variable part representing said supplemental information. A method is disclosed in D1 for embedding the watermark pattern in the encoded signal such that it is easy to detect, but difficult to erase or modify without serious degradation of the quality of the audio or video content after decoding. Moreover, the watermark pattern has to be relatively long to prevent an unmarked, encoded signal from being classified accidentally as marked. Also the watermark should be detectable in a relatively short time, e.g. 1 to 10 seconds, to enable a fast response when classifying a signal. Known watermarks have the disadvantage that they represent only a limited amount of supplemental information. Manipulation of (parts of) the watermark by a malicious party is still possible with only a limited degradation of the content after decoding.

SUMMARY OF THE INVENTION

It is an object of the invention to provide means for recording supplemental information related to the content information such that manipulation of the supplemental information is countered more effectively.

For this purpose, the method of recording according to the invention is characterized in that a control signal is recorded representing a control pattern. The watermark pattern and the control pattern in combination represent the supplemental information, and the watermark pattern comprises the result generated by applying a one-way function to the control pattern. The method of encoding according to the invention is characterized in that a control signal is generated representing a control pattern, the watermark pattern and the control pattern in combination representing the supplemental information, and in that the watermark pattern is generated by applying a one-way function to the control pattern. The method of retrieving is characterized in that the watermark pattern and a control pattern in combination represent the supplemental information, and in that the control pattern is processed by a one-way function, and in that the supplemental information is verified by comparing the watermark pattern and the processed control pattern. For this purpose, the arrangement for processing an encoded signal representing content information and a watermark pattern representing supplemental information, which arrangement comprises a retrieval unit for retrieving the watermark pattern according to the invention, is characterized in that the arrangement comprises a control unit for receiving a control signal representing a control pattern, the watermark pattern and the control pattern in combination representing supplemental information, and a one-way function unit for generating a processed control pattern and a comparator for verifying the supplemental information by comparing the watermark pattern and the processed control pattern. A record carrier according to the invention comprises the encoded signal and/or the control signal as recorded information.

The above measures according to the invention have the effect, that a small change in the control pattern will result in a totally different processed control pattern due to the nature of the one-way function. When a malicious party manipulates the control pattern, the watermark no longer corresponds to the changed control pattern, or needs to be fully replaced. Hence manipulation of the control pattern can easily be detected during watermark verification in a player or recorder. Also, a small change to the watermark pattern cannot be matched by also modifying the control pattern due to the nature of the one-way function, which prohibits calculating the input data 'backwards' from a given output value. This is advantageous in that any changes to the control pattern or the watermark can be easily detected. If the malicious party wants to manipulate the supplemental information represented by the watermark and/or the accompanying control signal, he is forced to fully replace the watermark pattern, which will result in severe loss of quality in the reproduced content, whereas even minor changes to the watermark pattern cannot be matched by calculating a corresponding control pattern and will be detected also.

It is noted, that a system for copy protection of recorded signals, an information carrier and reading device are known from EP-0545472 (document D2). The known system uses a physical mark representing supplemental information for controlled information reproduction. If the information is copied on a writable information carrier, the information of this copy will not be reproduced, because during the writing process only the information is recorded and the copy itself does not contain the physical mark. A problem in the known system is that it is not possible to allow a copy to be made which cannot be copied further. In an embodiment of the system according to our invention the above control pattern has the function of a copy permission mark, which is distributed along with the signal reproduced from an original recording. The recorder of that embodiment does verify the watermark in the signal against the copy permission mark. If both marks correspond, the content is recorded on a recordable record carrier and thus a first generation copy is made, but the permission mark itself is not recorded on the copy. So if the signal of the copy is reproduced, it no longer comprises the copy permission mark. The recorder will not make another recording from the signal from the first generation copy. Hence one and only one generation of copies can be made.

An embodiment of the arrangement for generating and/or processing an encoded signal according to the invention is characterized in that the one-way function unit is arranged for generating a n-time processed control pattern by passing the control pattern n times through a cryptographic one-way function, n being an integer >0. This has the effect, that the encoded signal comprises a watermark pattern and a control signal comprises a control pattern as a cryptographically controlled counter. The counter value implicitly represented by the control pattern is determined comparing n-time processed control patterns and the watermark pattern until a match is found (or no match is possible within a predetermined maximum count). The counter is cryptographically decreased in the player before outputting the processed control pattern to a recorder. The recorder verifies the counter and, if the count permits, decreases the counter again and makes a recording including the processed control pattern. This has the advantage, that a limited number of generations of copies can be allowed, whereas copy control is effected in the player and the recorder. The decreasing is performed by a cryptographic one-way function, which cannot be inverted without a huge, prohibitive computational effort, so increasing said counter value is virtually impossible. As soon as the counter is decreased too often, the processed control pattern no longer matches the watermark. The player and recorder will then block reproducing and/or recording the information.

Further advantageous, preferred embodiments of the system and arrangements according to the invention are also described.

BRIEF DESCRIPTION OF THE DRAWINGS

These and other aspects of the invention will b e apparent from and elucidated further with reference to the embodiments described by way of example in the following description and with reference to the accompanying drawings, in which.

DESCRIPTION OF THE PREFERRED EMBODIMENTS

The general concept of the invention is addition a control pattern to a watermarked, encoded signal, such that a one-way function can be used for generating the watermark from the control pattern. This allows a check at the destination of the watermarked signal for the integrity of the watermark and the accompanying control pattern. This has several advantages, e.g. the watermark may be relatively short and does not need its own integrity check bits, it may be repeated every few seconds in the signal allowing a classification of parts of the signal after editing, etc. As the watermark has to match a processed control pattern generated by applying a one-way function, it is computationally not feasible to calculate the control pattern "backwards" from a watermark. Tampering with control pattern and watermark is only possible by fully replacing both, which will result in serious degradation of the quality of the reproduced content. If a valid control pattern is not available, reproduction or recording of the encoded signal may be controlled or blocked in players and/or recorders complying with the copy-protecting rules. Preferably all devices available to the consumer comply with the watermark pattern and do not accept any signal without the control signal. A lot of applications may benefit from this control, e.g. copy control, payment of copyright fees, music or video rental, etc. The copy control may be similar to said DCC copy bits. The presence of a control pattern may be required to allow playback, and/or to indicate the copyright status, e.g. allowing one generation of copies. Also a release after a certain date may be effected by distributing the control pattern separately after that date. Further any related information may be indissolubly attached, e.g. author, song text, titles, performers, or a period of use may be included in the control pattern.

An embodiment of the invention is a system for copy protection allowing one generation of copies, also called copy-once. A professional audio stream contains embedded copy-right data that grants permission to copy once. This is implemented by embedding a watermark $y_{co}$ in the audio stream. Moreover the professional disc contains a special permission mark $x_{co}$ where $y_{co}=H(x_{co})$ with $H(\ )$ a cryptographic one-way function. The mark $y_{co}$ remains with the audio (possibly embedded) during playback, but it is removed by the consumer recorder. A copy made by the recorder therefore does not contain the permission mark and cannot be copied.

Figure 3:
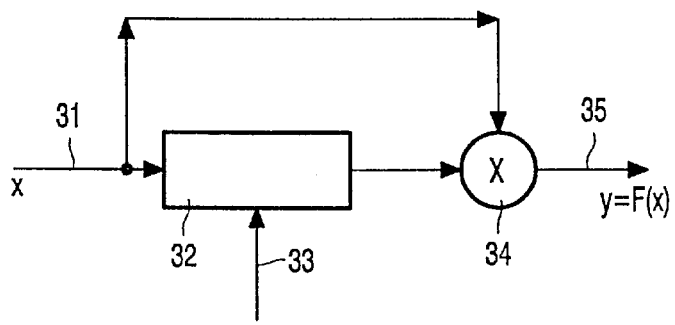

For the embodiments of the system a suitable relation between the watermark representing a bitpattern y and the control pattern x is a one-way function. An implementation of the one-way function can be $y=x^2 \bmod N$ with N a public modulus. Here N is the product of two secret large primes (N=p q). In fact N can be part of the data that is embedded in the watermark, i.e., concatenated to y. Another possibility is the discrete-log one-way function conjectured by Diffie and Hellman [1976] (=document D4): $F(x)=\alpha^x$ in GF(p) with $\alpha$ a primitive element of GF(p). Here p is a large prime such that p-1 has a large prime factor. The above two implementations bear the disadvantage that the size of the arguments, i.e., the number of bits needed to be secure, is quite large. A practical system based on fewer bits can be to apply an appropriate secret-key encryption algorithm, e.g. the DES, with $y=F(x)=x \oplus DES(x)$. This is illustrated in the circuit of FIG. 3. FIG. 3 shows an implementation of a one-way function generator based on secret-key encryption algorithm. On the input 31 the control pattern x is applied and processed in the encryptor 32 by using a key from a key input 33. The output of encryptor 32 is bitwise EXOR'd to the input x by logic unit 34, resulting in bitpattern y on the output 35. In this circuit, the key can be made public or included in the watermark, i.e. concatenated to y.

A suitable watermark for an audio signal with the DSD format (see document D3) is embedded by forcing a small fraction (0.01% to 1%) of the bits to specific values determined by W. This makes the detection simple, as a player or recorder only has to check the value of predetermined bits at predetermined locations. The artefacts caused by bits forced to represent a watermark can be minimized by noise shaping. We found for DSD that a watermark involving 1% of the bits will reduce the signal-to-noise/distortion ratio by one dB for a SNR in excess of 110 dB. On the other hand, if an attacker changes the value of these bits, the SNR dramatically deteriorates by several tens of dBs. For video a suitable watermark is embedded in the compressed MPEG, e.g. in the picture type (PTY watermarking, described in D1).

A further embodiment of the invention is a system for copy protection allowing n generations of copies, also called copy-control with copy-n-times feature. This embodiment for copy protection of recorded signals allows a limited number of copies. In our concept, professionally released titles contain at least two different types of copy-control marks: a watermark embedded in the content, and a copy-control (validation/authorization) control pattern attached to the content but removable and modifiable by recorders. Said control pattern is called a copy-control ticket. The ticket in the digital signal stream is modified every time that the signal passes a record or playback device. A cryptographic relation between the watermark and ticket is verified during each playback and each recording. An optional third type of copy-control mark, a record carrier pattern representing a recording medium mark identifying the medium (disc/tape/etc), may be applied separately or may also be related to the same watermark. A recording medium mark can be represented for instance by a wobble groove or a pit jitter modulation, and it preferably also is visually detectable. Recordable media may carry a fixed predetermined medium mark identifying the medium as recordable, or as a professional disc from a known source. A separate check may be made for the medium mark, which may be a predetermined value or a value related to the watermark and/or the ticket via a cryptographic function. In the total system concept, we distinguish Seed U: a random number generated by the content owner.

A medium mark P that is present on professionally released discs/storage media; recordable media carry a predetermined value of P.

A watermark W, embedded in the content. W can simultaneously exist in all digital representation formats (audio in DSD format, bit stream, PCM, or video MPEG etc.) as well in an analogue version. If this concept is applied to video, an analogue watermark can for instance be combined with ticket, represented in Vertical Blanking Intervals. The digital watermark can be represented both in the MPEG PTY (Picture Type) sequence and in the pixel domain, the ticket can be stored in user_data fields of a GOP (Group Of Pictures) header. User home recordings (not subject to copyright) can be distinguished as such through the absence or predetermined values of W.

A Copy-Control Ticket T which plays the role of a cryptographic counter. T is a small data field that is present in the data headers, e.g. added to the signal in a similar manner as said DCC copy control bits. T typically contains 40 to 1000 bits.

In the total system concept, Ticket T in the stream is replaced by T'=F(T) during each recording or playback operation, wherein F is a publicly known cryptographic one-way function. That is, neither the player nor the recorder pass T transparently but feed it through function F. Our scheme exploits the concept that T can be regarded as a cryptographic counter, which can easily be incremented but cannot be decrement unless an attacker can invert F. From a cryptographic point of view it is not necessary that F is kept secret to potential attackers. Here we aim at restricting the length of the copy paths, e.g. to prohibit generation of copies of copies of copies, i.e. the number of generations. Playback is allowed only if the watermark in the stream matches $F^m(T)$ where m is the number of sequential recording or playback operations that are still allowed. Typically m is odd. Recording is allowed only if the watermark in the stream matches $F^m(T)$ where m is the number of sequential recording or playback operations that are still allowed. Typically m is even. In the above statements m may either be available explicitly, or the device may check all m which are reasonably small, e.g. m<4 if copy once is the maximum number of copies allowed to made anyhow. An example of a possible cryptographic one-way function is described above with reference to FIG. 3.

In an embodiment the number of parallel copies from one original is restricted. The above concept is extended and applied to restrict the number of parallel copies made from one disc, e.g. if the customer is only allowed to copy directly from the original disc that he bought from the publisher, and the number of such copies is restricted. To this end we need a small recordable area on each professionally released title to store and update T. The basic idea is that the player modifies T into F(T) every time that the player authorises a recorder to make a copy. In such case the original disc as sold by the publisher is produced by initially generating a seed U. From this seed, the following variables are computed: P=F(U), and T=F(F(U)) which we denote as $F^2(U)$. For a disc that the customer is allowed to copy n-times in parallel, a watermark W is created as $W=F^{n+1}(U)$. The player outputs the contents, but not T during normal operation. During recording the recorder asks the player to provide a ticket T such that W=F(T), which is also recorded on the recordable disc. The player reads T from and replaces it by F(T). The player only provides F(T) to the recorder if the player reads from an original disc, i.e., with a valid P matching T. The recorder iteratively replaces T by F(T) until W=F(T). The content with embedded W and appropriate T are recorded to disc. If the player reads a recordable disc, T is never released to the outside.

A copy control concept is disclosed that relies on physical marks on the medium, watermarks embedded in the content and a copy control ticket that is represented as a digital number. It is to be noted, that this concept embodies two separate mechanisms: a watermarked content in combination with both the control ticket T and a medium mark P. Obviously the concept of using a control ticket in combination with a watermarked signal can be applied separately in a system for transferring content, e.g. in a broadcast system or on internet. Basically the control ticket provides a counter which can be incremented but not decremented. The control ticket concept is particularly suited for the watermarking of DSD audio as described in document D3. The concept of embedding data into the LSB bits and reducing their artefacts by noise shaping can also be applied to Pulse Code Modulation audio. The idea can also be applied to MPEG video storage of DVD. The watermark can be stored in GOP structure by modifying the PTY sequence. In addition an identifier of the recorder may be included in W or in a separate watermark $W_i$. Preferably each home recorder includes such an identifier when making a recording of unmarked material. The identifier may be just a manufacturer code, type and serial number of the recorder.

Figure 1:
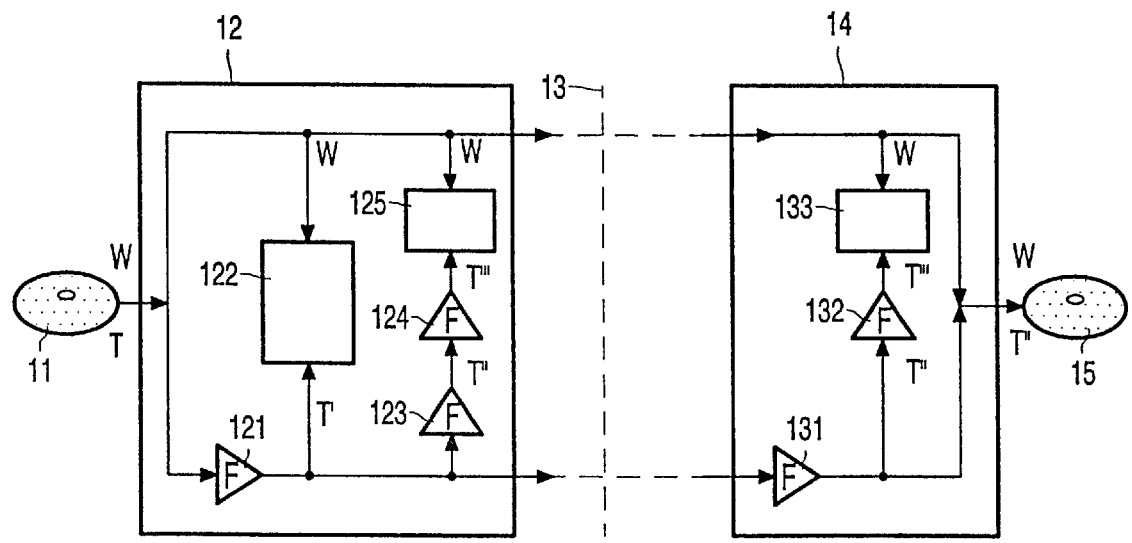
FIG. 1 shows a copy control system and FIG. 2 shows the one-way processing of a copy control pattern comprising two parts and FIG. 3 shows a one-way function.

FIG. 1 shows a copy control system according to the invention. The music content on a record carrier 11 is watermarked by a watermark pattern W, while the record carrier 11 further comprises a control pattern, the copy control ticket T. The player 12 comprises the usual elements for reproducing the music from the record carrier, e.g. known from a CD player, and verifying means comprising three one-way function units 121,123,124 comprising a one-way function F (see description with reference to FIG. 3) and two comparators 122,125, which may be implemented in a single calculation unit, e.g. a microprocessor and a program. The watermark W and the ticket T are derived from the original record carrier 11. The ticket T is coupled to one-way function unit 121 resulting in T', which T0 is coupled to first comparator unit 122 and a second one-way unit 123, which has its output T" coupled to a third one-way unit 124 resulting in T'" coupled to a second comparator unit 125. Both comparator units receive the watermark W on a second input for comparison. If the first comparator unit 122 finds equality, then playback is allowed, but no (further) copying. If the second comparator unit 125 finds equality, then playback is allowed and one copy generation is still possible. If both comparators find no equality no playback allowance is given. The player has an output to a digital interface 13, e.g. a IEC 958 or P-1372 digital interface, for outputting the content information comprising the watermark W and the processed ticket T'. The recorder 14 has an input for receiving said signals from the digital interface 13. The watermark W is coupled to a third comparator unit 133. The ticket T' is coupled to a fourth one-way function unit 131, resulting in a processed ticket T", which T" is coupled to a fifth one-way function unit 132, resulting in T'" coupled to the third comparator unit 133. If the third comparator unit 133 finds equality between T'" and W, copying is allowed and the music content comprising the watermark W and the two times processed ticket T" are recorded on a recordable record carrier 15. So one generation of copies is allowed when the 3-time processed control pattern T'" equals W. The resulting copy comprises a 2-time processed control pattern T", which allows playback of this first generation copy, as the player will first generate a 1-time processed pattern, i.e. (T")', which will now match the watermark pattern W. Further recording of the music content is blocked by the recorder, as the 5-time processed ticket does not match the watermark. Even if a tampered recorder is used by a malicious party, the resulting copy comprises a 4-times processed ticket T'" as presented by the player. Such a copy cannot be played on a compliant player, as the first and second comparators will not find equality. So both a recorder and a player need to be tampered with to create and use illegal copies.

In an embodiment of the transfer system the n-time processed control pattern constitutes a cryptographically protected counter. This counter may be used for counting a number of times that an encoded signal is permitted to be played back, e.g. in a audio or video rental system, or recorded, e.g. for counting so called parallel copies. In such applications the control signal is preferably stored and updated on the record carrier itself, but may alternatively be stored separately, e.g. in the playback and/or recording device or on a chipcard. Also a number of control signals may be stored, whereas for each action to be controlled one of the control signals is destroyed or made unaccessible, e.g. on an optical disc by applying or removing ink in the respective area.

Figure 2:
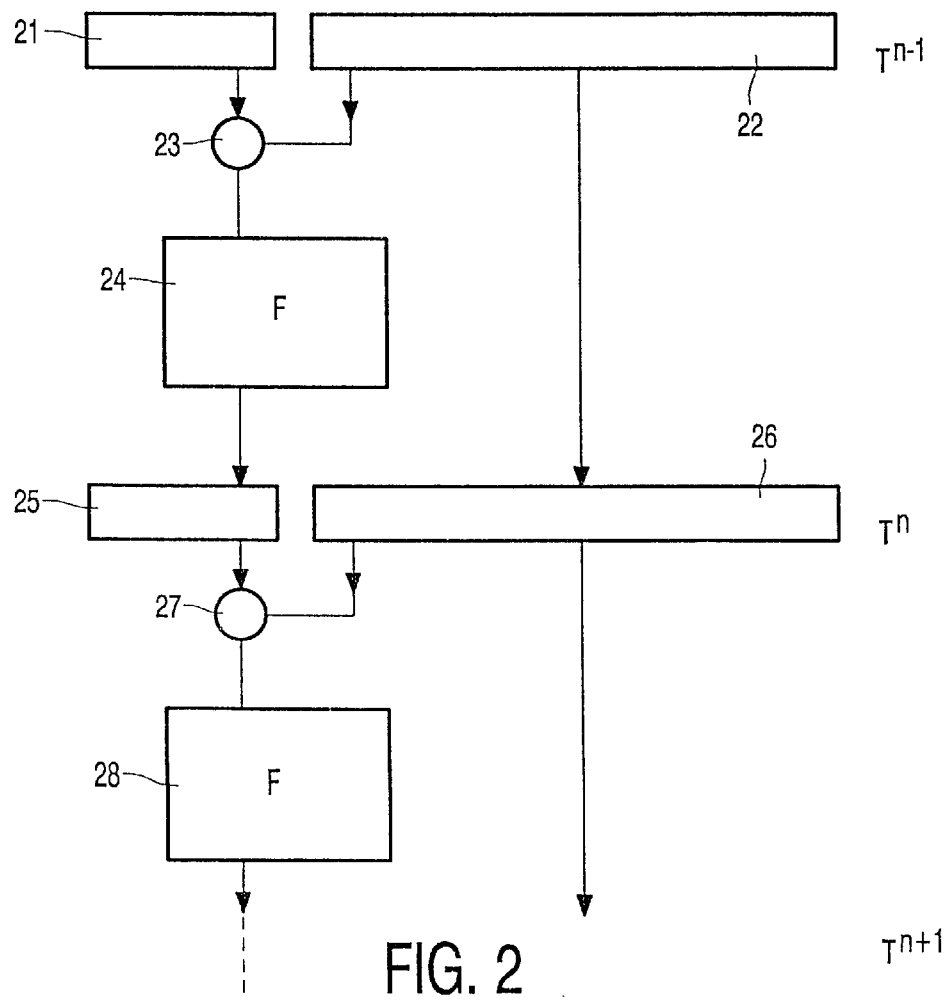

FIG. 2 shows the one-way processing of a control pattern $T^{n-1}$ comprising two parts. The first part 21 is a seed and the second part 22 is an info part comprising supplemental information, such as the name of the author, the owner, a release date, etc. Both parts 21,22 are combined in combination unit 23, e.g. concatenated, added or EXOR'd, and the result is coupled to a first one-way function unit 24. Control pattern T' comprises again two parts, the first part 25 being the output of the first one-way function unit 24, and the second part 26 being the same as info part 22. For the next one-way processing cycle the same functions are applied, i.e. a further combination unit 27 and a further one-way function unit 28, resulting in a control pattern $T^{n+1}$ again comprising two parts. After a predetermined number of one-way cycles the first part of the pattern from the output of the one-way unit matches the watermark as with the previously described embodiments. This has the advantage, that the info part 22,26 of each generation control pattern is directly readable and also protected against manipulation, as any small change in the info part will completely change the resulting pattern at the output of the one-way units during the verification. In the event of an encrypted encoded signal, the info part may comprise the decryption key. The info part 22 may also comprise an explicit counter value, which has to be decreased before processing the next (n+1)-time processed control pattern. The explicit counter value p then indicates the number of processing cycles of the one-way unit. This has the advantage, that only the p-time processed control pattern needs to be compared to the watermark pattern. Of course a predetermined change, such as an explicit counter value included in the info part, has to be changed during generation and verification in the same way. Hence tampering with such predetermined changing values is effectively prevented.

Figure 4:
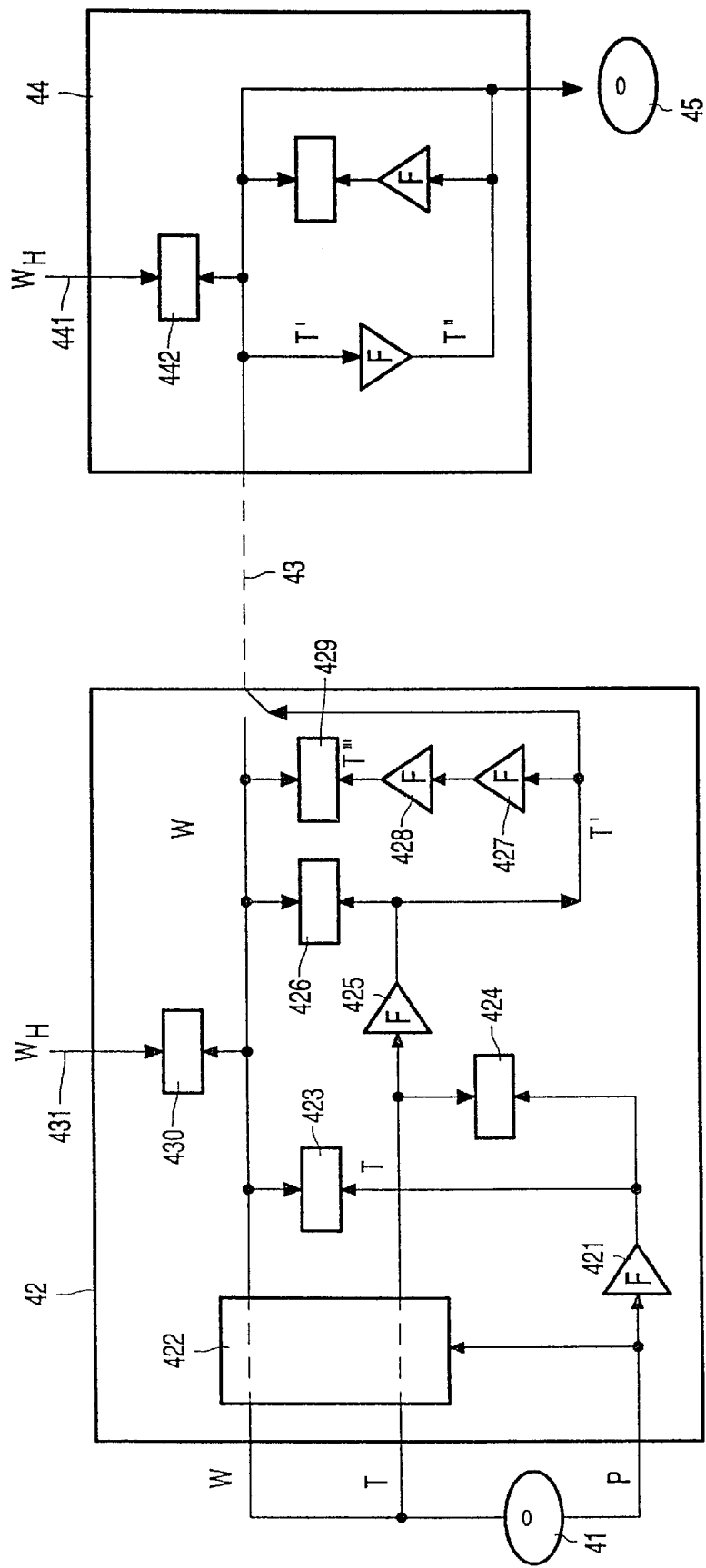

FIG. 4 shows a copy control system using a medium mark P. The medium mark allows two separate conditions to be verified for an original disc before playback is allowed. The record carrier 41, e.g. an optical disc, comprises a further modulation pattern of variations of a physical parameter representing a medium mark P related to the watermark pattern W, the further modulation pattern being of a different type than the modulation pattern. An example of further modulation pattern, such as a wobble of a track, can be found in D2. According to the invention, the medium mark P is coupled to a one-way unit 421 having an output coupled to a first comparator 423 and/or a second comparator 424. Each one-way units comprises a cryptographic one-way function, e.g. as described with reference to FIG. 3. The first comparator 423 also receives the watermark W, and at equality the first condition for a no-copy original disc is detected. The second comparator 424 receives the control ticket T, and at equality a first condition for a copy-once allowed disc is detected. Ticket T is also coupled to a second one-way unit 425 resulting in T', which T' is coupled to a third comparator 426, which also receives the watermark W. At equality the second condition for a no-copy original disc is detected, or a legal first generation copy is detected (in which case the medium mark P may be absent or has a predetermined value). The 1-time processed ticket T' is coupled also to an output of the recorder on digital interface 43, and to a third one-way unit 427, which is coupled to a fourth one-way unit 428, resulting in a 3-time processed ticket T''', which is coupled to a fourth comparator 429 also receiving the watermark W. At equality the second condition for a copy-once allowed disc is detected. When the conditions for playback are fulfilled, the music content including the watermark W is outputted from the player 42 to the digital interface 43. A recorder 44 may be coupled to the digital interface 43 for recording the music. The watermark W and the ticket T' from the interface are verified in the same way as in the recorder described with reference to FIG. 1.

In an embodiment the player 42 and the recorder 44 have an input 431,441 for a home watermark $W_H$. In the player the home watermark $W_H$ is coupled to a fifth comparator 430, which also receives the watermark. At equality a home personal creation is detected. The input 431 is preferably coupled to said fifth comparator 431 via a further one-way unit, in which case the home seed value is to be supplied to the input of the further one-way unit. The home seed value or watermark may be stored in a memory of the player/recorder, or on a separate memory module, e.g. a chipeard, or may be kept on paper and entered via a keyboard by the user like a PIN code. Alternatively recordings of consumer's personal audio creations can be recognized and distinguished, because their watermark is a fixed watermark, e.g. the all-zero word.

In an embodiment of the system the encoded signal is encrypted, while P is used for decryption, shown as optional decryption unit 422 connected between the read signal and the signals carrying the plain contents including W and ticket T. This is advantageous for protecting the disc against uncontrolled data retrieval or bit-to-bit copying, e.g. on a computer system. The carrier pattern P may be generated by a one-way function in a device for making a master disc, which master disc is used for multiplying the disc. The mastering device may then generate and output the watermark pattern by applying a further one-way function on the carrier pattern. This has the advantage, that the carrier pattern P is not available outside the mastering device, while the mastering device cannot be controlled to produce a disc with a predetermined carrier pattern (e.g. extracted from a source disc to be reproduced by a malicious party).

The control pattern or ticket may be recorded along with the content information, or alternatively a separate location not directly accessible to a malicious party may be selected, e.g. located in file headers or in the lead-in section of a CD or DVD. The copy-control ticket can be hidden in the MPEG video stream. In an embodiment this data is located in the GOP header, in the extension_and_user_data field (see MPEG video compression standard).

Figure 5:
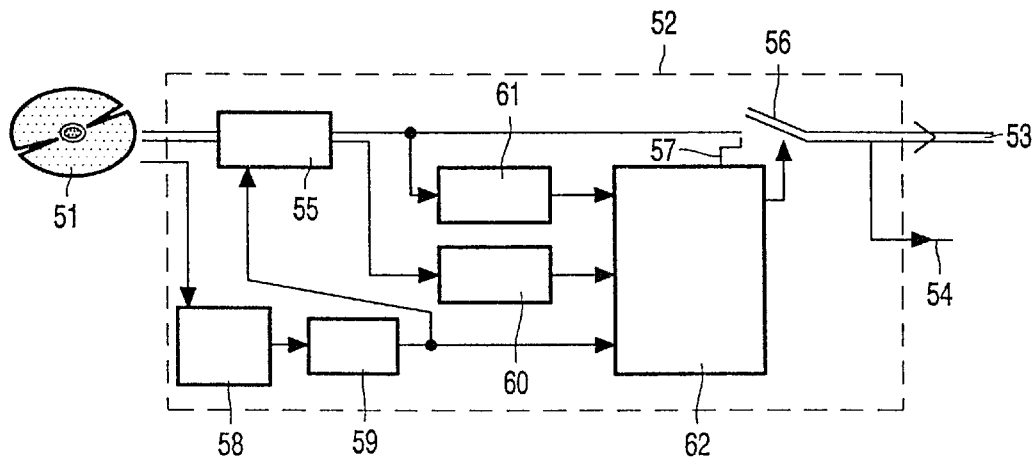
FIG. 4 shows a copy control system using a medium mark P and FIG. 5 shows an arrangement for processing an encoded signal and FIG. 6 shows a recording arrangement.

FIG. 5 shows an arrangement for processing an encoded signal. The arrangement shown is player 52 for playing an optical disc 51. The player is provided with read means comprising a read head and a servo/control unit 58 for reading information from the disc 51. The player has a digital output 53 to a digital bus for outputting the retrieved content signal including the watermark W and a processed control ticket T. A further analog output 54 for connecting a headphone or other audio equipment may be provided for outputting the music content after processing by a D/A convertor (optional, not shown). The signal read from the disc 51 is processed by read unit 55, which may be provided with a decrypt function as described with reference to FIG. 4. The read unit 55 is coupled to a retrieval unit 61 for retrieving the watermark pattern W, and to a further retrieval unit 60 for recovering the control pattern T. Watermark W and control pattern T are connected to control unit 62. The control unit 62 is provided with a one-way unit comprising the cryptographic one-way function F (described above with reference to FIG. 3), which function F can be applied n times to generate an n-times control pattern T'', and a comparator unit for comparing the processed control pattern r and the watermark. The 1-time processed control ticket T' on output 57 of the control unit 62 is switched to the digital output 53 together with the watermarked content signal via a switch 56, which switch 56 is operated by the control unit 62 in dependence on a verification process. Hence the output signal representing the content information is only available on output 53 in dependence on the supplemental information represented by the watermark in combination with the control ticket. The following checks are performed in the verification: $W=F(T)$ or $W=F^3(T)$ indicating that playback is allowed, or possibly further repeated tests up to $W=F^{2n+1}(T)$. The first successful test of a n-times processed control pattern T''' equals W indicates a counter value m of the control pattern. The counter value m can be used to verify the generation of a copy in a system allowing n generations of copies, or the number of times a certain act is allowed (e.g. pay per use for a software program), or any other application needing a secure counter. In an embodiment of the player a carrier pattern read unit 59 is provided for retrieving a medium mark P from the record carrier, e.g. from the servo signals of servo unit 58 for a wobble pattern as described in D2. The medium mark P is connected to the control unit 62, wherein a further check $T=F(P)$ is performed for verifying the control pattern T and the physical mark P. The medium mark P may be coupled to an optional decryption unit in read unit 55. If encryption has been applied to the disc content, the player decrypts the stream, using P.

Figure 6:
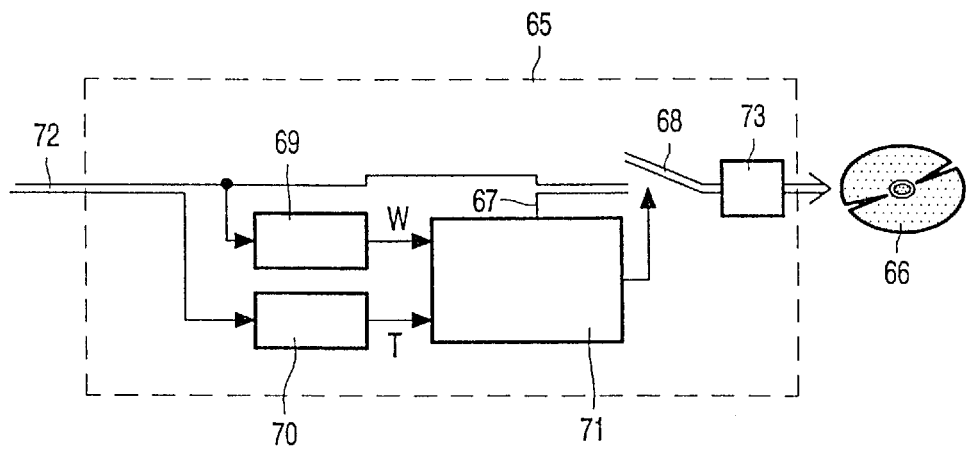

FIG. 6 shows a recording arrangement. The arrangement is a recorder 65 for recording a recordable disc 66. The recorder has a digital input 72 from a digital bus for receiving a signal to be recorded including a watermark W and a control ticket T. The input 72 is coupled to a retrieval unit 69 for retrieving the watermark pattern W, and to a further retrieval unit 70 for recovering the control pattern T. Watermark W and control pattern T are connected to control unit 71. The control unit 71 is provided with a one-way unit comprising the cryptographic one-way function F (described above with reference to FIG. 3), which function F can be applied n times to generate an n-times control pattern T'', and a comparator unit for comparing the processed control pattern T'' and the watermark. The 1-time processed control ticket T' on output 67 of the control unit 71 is switched to a recording means 73 together with the watermarked content signal via a switch 68, which switch 68 is operated by the control unit 71 in dependence of a verification process.

Hence the output of the recording means representing the content information is only available to the recordable disc 66, if the verification process is positive and indicates that a copy may be made. The recorder always passes the copy control ticket T through the one-way function in control unit 71 before transferring it to disc. Recording of copyrighted audio is allowed if the watermark in the stream matches $W=F^2(T)$. In an embodiment allowing more generations of copies, $W=F^{2n}(T)$ is checked. If an attacker manages to modify his recorder and record audio even if the appropriate T is not present, a normal player will reject to playback the disc. In professional publishing a professional title is produced by initially generating a seed U. From this seed, the following variables are computed: $P=G(U)$, and $T=(F(F(U))$ which we denote as $F^2(U)$. For a disc that the customer is allowed to copy n-times, a watermark W is created as $W=F^{2n+1}(T)$. The one-way function G and variable P may be specified such that P also contains an identifier for the publisher or a serial number of the mastering machine. If a pirate publisher attempts to write a particular P, in order to make a bit-exact copy of a copyright disc, that pirate must tamper with his mastering equipment. The professionally released disc contains P, T, W and possibly also n, with the above cryptographic relation. Legal copies of professionally released (copyrighted) content on recordable media contain watermark W and a ticket T such that $W=F^m(T)$, with m=1, 3, 5, 7, . . . . In case m=1, the content of the disc/media may not be copied any further. Data streams of professionally released (copyrighted) content to a recorder contain watermark W and a ticket T such that $W=F^m(T)$, with m=2, 4, 6, . . . . In case m=2, the content may be recorded and played back one more time.

Although the invention has been explained by an embodiment using a disc as recording medium, it will be clear that other systems for transferring information can be employed in the invention. For example, the encoded signal and the control signal may be transferred via a data-network like the internet.

Whilst the invention has been described with reference to preferred embodiments thereof, it is to be understood that these are not limitative examples. Thus, various modifications may become apparent to those skilled in the art, without departing from the scope of the invention, as defined by the claims. For example, the encoded signal might be distributed on a read-only disc or tape, while the control signal might be distributed separately. Further a watermark in the analog domain may also be employed, although in general such watermarks are more difficult to retrieve. Unlimited use of the control signal might be prevented by encrypting the control signal by a key known to the destination only, e.g. a key built in specific reproducing devices or a public key supplied by the destination using a public key system (e.g. RSA). Also the encoded signal and/or the control signal may additionally be protected by scrambling or encryption methods, or may be additionally provided with a digital signature. A free-copy ticket R, which is a digital signature over (part of) the content and/or the watermark W may be employed. Further, the invention lies in each and every novel feature or combination of features, including those within the mentioned incorporated or related documents.

LIST OF RELATED DOCUMENTS (D1) WO 97/13248-A1 (PHN 15391) Watermarking encoding signals
(D2) EP-0545472 (PHN 13922) Closed information system with phgysical copy protection
(D3) EP-A 97200197.8 filing date 27.01.97 (applicants ref PHN 16209) Watermarking of Britstream- or DSD-signals (A.A.M. Bruekers et al. )
(D4) New Directions in Cryptography (Diffie and Hellman), IEEE Transactions on information theory, Vol IT-22, No. 6, November 1976, p.644–654.

What is claimed is:

1. A method of recording and reproducing content information and supplemental information relating thereto, in which:
   an encoded signal representing the content information and a watermark pattern representing the supplemental information is recorded,
   a control signal is also recorded, representing a control pattern, the watermark pattern and the control pattern in combination constituting the supplemental information, and
   the watermark pattern corresponds to the result obtained by applying a one-way function to the control pattern.

2. A method of encoding content information and supplemental information relating thereto, comprising:
   generating an encoded signal by encoding the content information in accordance with a watermark pattern representing the supplemental information,
   generating a control signal representing a control pattern, the watermark pattern and the control pattern in combination constituting the supplemental information, and
   generating the watermark pattern by applying a one-way function to the control pattern.

3. A method of retrieving supplemental information related to content information, comprising:
   retrieving a watermark pattern representing supplemental information from an encoded signal representing the content information and the watermark pattern, the watermark pattern and a control pattern in combination constituting the supplemental information,
   processing the control pattern by a one-way function, and
   verifying the supplemental information by comparing the watermark pattern and the processed control pattern.

4. A system for transferring content information and related supplemental information from a system input to a system output via a transfer signal which includes an encoded signal, the system comprising:
   a transmitter at the system input for transmitting the transfer signal, said transmitter including encoding means for generating the encoded signal by encoding the content information in accordance with a watermark pattern representing the supplemental information, and
   a receiver at the system output for receiving the transfer signal, said receiver including means for retrieving the watermark pattern,
   the transfer signal further including a control signal representing a control pattern, the watermark pattern and the control pattern in combination constituting the supplemental information,
   the transmitter further including a first one-way function means for generating the watermark pattern in dependence on the control pattern, and
   the receiver further including a second one-way function means for processing said control pattern and comparator means for verifying the supplemental information by comparing the watermark pattern and the processed control pattern.

5. An arrangement for generating an encoded signal for recording, which arrangement comprises:

encoding means for generating the encoded signal by encoding content information in accordance with a watermark pattern, control means for generating a control signal representing a control pattern, the watermark pattern and the control pattern in combination constituting supplemental information, and one-way function means for generating the watermark pattern in dependence on the control pattern.

6. The encoded signal generating arrangement as claimed in claim 5, in which the one-way function means is also adapted to generate a n-time processed control pattern by passing the control pattern n times through a cryptographic one-way function, n being an integer >0.

7. The encoded signal generating arrangement as claimed in claim 6, in which n=3, thereby indicating that one generation of copies is allowed.

8. The encoded signal generating arrangement as claimed in claim 5, further comprising identification means for including a recorder identification code in the supplemental information.

9. An arrangement for read-out of a recorded encoded signal representing content information as well as a watermark pattern combined with a control pattern, said combination constituting supplemental information, which read-out arrangement comprises:

a retrieval unit for retrieving the watermark pattern, control means for deriving a control signal from the control pattern, one-way function means for generating from the control signal a processed control pattern, and comparator means for verifying the supplemental information by comparing the watermark pattern with the processed control pattern.

10. The read-out arrangement as claimed in claim 9, in which the one-way function means is also adapted to generate a n-time processed control pattern by passing the control pattern n times through a cryptographic one-way function, n being an integer >0.

11. The read-out arrangement as claimed in claim 10, in which:

the control pattern includes a first part and a second part, and the arrangement further comprises means for combining the n-time processed control pattern and the second part of the (n−1)-time processed control pattern, the output of the combining means being coupled to an input of the one-way function means.

12. The read-out arrangement as claimed in claim 10, further comprising control means for outputting a further control signal representing the n-time processed control pattern, n being equal to 1.

13. The read-out arrangement as claimed in claim 10, in which the comparator means is also adapted to determine a value m by:

a first comparison of the watermark pattern and the n-time processed control pattern at n=1; and at least one further comparison of the watermark pattern and the n-time processed control pattern at n>1, m being the value of n which results in a successful comparison.

14. The read-out arrangement as claimed in claim 13, further comprising output means for producing an output signal representing the content information in dependence on the supplemental information.

15. The read-out arrangement as claimed in claim 14, in which the output means includes means for recording the output signal on a record carrier.

16. The read-out arrangement as claimed in claim 15, in which the recording means is also adapted to record a further control signal representing the n-time processed control pattern.

17. The read-out arrangement as claimed in claim 14, in which the output means is also adapted to provide the output signal if m=1 or m=3.

18. The read-out arrangement as claimed in claim 15, in which the recording means is also adapted for recording if m=2.

19. The read-out arrangement as claimed in claim 9, further comprising playback means for inputting the encoded signal from a record carrier.

20. The read-out arrangement as claimed in claim 9, further comprising:

carrier pattern read means for retrieving a carrier pattern from a record carrier on which the encoded signal is recorded, one-way function means for generating a processed carrier pattern, and a comparator for comparing the watermark pattern and the processed carrier pattern.

21. An encoded signal for use in a recording signal generating arrangement in which the encoded signal represents content information and a watermark pattern, the watermark pattern being the result of a control pattern processed by a one-way function, the watermark pattern and the control pattern in combination constituting supplemental information.

22. A control signal for use in a recording signal generating arrangement, in which:

the control signal represents a control pattern for controlling an encoded signal representing content information as well as a watermark pattern, the control pattern and the watermark pattern in combination constitute supplemental information, and the watermark pattern corresponds to the result of processing the control pattern in accordance with a one-way function.

23. A record carrier having recorded thereon an encoded signal in the form of a watermark pattern and a control pattern, and in which:

the watermark pattern is indicative of said control pattern after n-times processing, and the n-times processing of the control pattern is by a cryptographic one-way function, n being an integer >0.

24. The record carrier as claimed in claim 23, wherein:

the encoded signal is represented by a first modulation pattern of variations of a physical parameter, and the record carrier includes a second pattern of variations of a physical parameter representing the carrier pattern in a different way than the representation of the encoded signal.

25. The record carrier as claimed in claim 23, in which:

the record carrier is of an optically readable type, and the encoded signal is represented by a modulation pattern of optically detectable marks in a track.

26. The read-out arrangement of claim 9 in which:

the one-way function means is further adapted to generate a n-time processed control pattern by passing the control pattern n times through a cryptographic one-way function, n being an integer >0, said arrangement further comprises further control means for outputting a further control signal representing the n-time processed control pattern, n being equal to 1, the comparator is also adapted to determine a value m by a first comparison of the watermark pattern and the n-time processed control pattern at n=1 and at least one further comparison of the watermark pattern and the n-time processed control pattern at n>1, m being the value of n resulting in a successful comparison, said arrangement further comprises output means for producing an output signal representing the content information in dependence on the supplemental information, the output means includes means for recording the output signal on a record carrier, the recording means is also adapted to record the further control signal, the output means is also adapted to output the output signal if m=1 or m=3, and the recording means is also adapted to record if m=2.

* * * * *